United States Patent [19]
Alsborg et al.

[11] Patent Number: 5,491,595
[45] Date of Patent: Feb. 13, 1996

[54] MAGNETIC HEAD GUIDANCE AND CALIBRATION SYSTEM AND METHOD DESCRIPTION

[75] Inventors: Roger C. Alsborg, Orange; Jose I. DeArmas, Alta Loma; Scott L. Hanson, Costa Mesa; William B. Higgins, Silverado; Philip G. Miyasato, Orange; Ashok B. Nayak, Glendora, all of Calif.

[73] Assignee: Conner Peripherals, Inc., San Jose, Calif.

[21] Appl. No.: 942,256

[22] Filed: Sep. 9, 1992

[51] Int. Cl.⁶ .................................................. G11B 21/12
[52] U.S. Cl. ........................ 360/75; 360/77.12; 360/78.02
[58] Field of Search .................................. 360/75, 77.12, 360/78.02, 105, 106, 109

[56] References Cited

U.S. PATENT DOCUMENTS

| | | | |
|---|---|---|---|
| 4,333,116 | 6/1982 | Schoettle et al. | 360/78.02 |
| 4,394,696 | 7/1983 | Yoshimaru | 360/78.02 |
| 4,594,620 | 6/1986 | Shoji et al. | 360/75 |
| 4,626,942 | 12/1986 | Shoji et al. | 360/97 |
| 4,639,796 | 1/1987 | Solhjell | 360/77 |
| 4,779,149 | 10/1988 | Watanabe | 360/109 X |
| 5,083,230 | 1/1992 | Nishioka | 360/78.04 |
| 5,177,648 | 1/1993 | Inoue | 360/75 |
| 5,198,947 | 3/1993 | Nayak et al. | 360/109 |

*Primary Examiner*—Aristotelis M. Psitos
*Assistant Examiner*—James L. Habermehl
*Attorney, Agent, or Firm*—Fliesler, Dubb, Meyer & Lovejoy

[57] ABSTRACT

Disclosed is a method and apparatus for guidance of a magnetic head to a predetermined reference position generally used to recalibrate head to media orientation. An electro-magnetic or photosensitive device is provided to accurately and repeatably position a magnetic head carriage to a reference point in order to calibrate the head gap location with respect to parallel tracks across the width of the media. A coarse and fine adjustment method is used to improve the accuracy of establishing the head at the reference position.

2 Claims, 9 Drawing Sheets

MAGNETIC HEAD GUIDANCE AND CALIBRATION SYSTEM AND METHOD DESCRIPTION

BACKGROUND OF THE INVENTION

1. Field of the Invention

The present invention relates generally to magnetic media drive apparatus, more particularly to magnetic media data storage peripheral apparatus for computer applications, and more specifically, to a device and method for the precise positioning of a read/write head with respect to the magnetic medium.

2. Description of the Related Art

Computers generally use magnetic media devices for the storage of software programs and data. Various types have been devised, including hard disk, floppy diskettes, optical and magneto-optical disk, and magnetic tape drives. Information is recorded onto and retrieved from the magnetic medium by using a head device (magnetic or laser) to create or sense, respectively, flux transitions on the medium that are representative of the binary "1's" and "0's" that form the digital information (such as a software program or user-created data).

While the invention disclosed will be recognized by those skilled in the art as applicable to any of these types of storage apparatus, the invention will be described in an embodiment for a streaming magnetic tape drive head positioning application. Examples of such devices are described in commonly assigned U.S. Pat. Nos. 4,717,866, 4,747,004, and Re. 33,661. A basic description of streaming tape drive technology can be found in STREAMING, Copyright 1982, Archive Corporation, Library of Congress Catalog No. 82-072125.

The magnetic tape used in streaming magnetic tape cartridge drives is nominally one-fourth of an inch in width and of various lengths, commonly from over two-hundred to six hundred feet per cartridge. Data is recorded in parallel tracks on the tape in serpentine, serial fashion. That is, when one track has been fully read from or written to, the direction of the tape is reversed and the next track used in the opposite direction. State of the art tape drives may create and use forty tracks squeezed across the one-fourth inch width of the tape and hold over one gigabyte of data. In order to read and write the data onto the tape in this fashion, the magnetic head must be able to move transversely across the tape in increments as small as the width of a track and be maintained in the proper orientation while using each track.

Generally, this can be accomplished by a lead screw mounting of the head that is driven by a stepper motor. The head is mounted on a "carriage" that threads onto the lead screw so that for a given amount of rotation of the lead screw, the head is displaced a predetermined distance across the tape. As the number of tracks increases across the fixed width of the tape, the head must be positioned with even greater precision. If the head is not accurately positioned over the proper data track, data transmission errors occur from reading data from the wrong track or writing data onto the wrong track, either of which may result in a loss of the data.

When a tape cartridge is loaded into a tape drive, in order to locate the head to a desired track location on the tape, the head must start from a fixed reference position. Precision alignment calibration of the head has been accomplished in several ways. For example, U.S. Pat. No. 4,476,503 describes the use of the physical edge of tape as a reference starting point to set the write or read gap of the magnetic head to seek a displaced track at a known spacing from the edge.

Another, simpler method is to use a mechanical head carriage "stop" on the lead screw. See e.g., U.S. Pat. No. 4,717,866, lead screw collar 42; or Re. 33,661, collar 32.

The process of so locating the head to a known reference position point is sometimes referred to as "recalibration." When a tape cartridge is loaded into a drive, or when a "reset" signal is received as an instruction from a computer to the drive controller circuitry, the head is located to such a fixed location reference stop prior to moving the head to an appropriate track to perform a read/write function.

A typical head carriage mechanical stop device is shown in FIGS. 1, 2 and 3 (Prior Art). A magnetic head 2 is mounted on a head carriage 4. The carriage 4 rides on a lead screw 6 to raise or lower the head 2 linearly across the width of a magnetic tape (not shown). A stepper motor 8 is connected by gears 10, 12 to the lead screw 6 to rotate the lead screw 6 and thus move the carriage 4 linearly along axis A—A such that head gaps 14 can be brought into preselected alignment with the various tracks of the tape. The lead screw 6 has a stop collar 16 fixedly mounted thereon by clamping screw mechanism 18. Referring to FIGS. 2 and 3, the stop collar 16 is furnished with a protrusion 20, having a face 22, that rotates radially in a fixed orientation orbit about axis A—A. Carriage 4 is provided with a fixed abutment protrusion 24, having a face portion 26. In operation, as the motor 8 turns the gears 10, 12, the lead screw 6 will rotate. With proper rotation, the carriage 4 will drop along axis A—A as shown in FIG. 2 until such position as stop collar protrusion face 22 meets carriage abutment face 26, physically stopping the motion of the carriage 4 (FIG. 3). This anti-rotation device establishes the "carriage stop" as a repeatable reference position point for the head carriage 4 and thus the head 2 with respect to the magnetic tape.

Conventional carriage stop techniques formed by a contact of mechanical features have inherent limitations and problems.

One problem is in maintaining accurate repeatability of the reference position. The protrusions must be manufactured to fairly tight tolerances in order to achieve acceptable repeatability. Since the magnetic head carriage guidance system is reliant upon physical contact, repeatability will be influenced by manufacturing tolerances, dirt, and wear. The repeated impact can eventually loosen the stop collar enough to cause a shift in the reference position. Moreover, repeated impacts can create undesirable and possibly catastrophic wear and tear on associated electrical wiring to the magnetic head.

When contact is made, any additional driving force from the motor cannot produce any further translation of the carriage. The energy supplied is converted to backlash forces and noise. Both the impact itself and the continued force creates wear on the various parts of the carriage guidance system as described above. In time, this will degrade the performance of the entire system. As the carriage guidance mechanism wears, the reference stop position can change and thus can move the magnetic head to a different reference position than that to which it has been initially calibrated at time of manufacture. If the head carriage migrates to such a new reference point, it produces additional errors such as azimuth shift and zenith shift at the head. Because of the microscopic track width, only a minimal change can affect the operational characteristics. Therefore, the primary performance of the tape drive—the storage of retrievable digital data—will be degraded.

Since the conventional carriage stop is form by a contact of two mechanical members, an acoustic noise is produced. Depending in its intensity, this may exceed the allowable noise specifications of the tape drive or, at the least, be undesirably annoying "noise pollution."

When the computer orders a head position recalibration process, the position of the head carriage is unknown. Thus, the carriage stepper motor must rotate to cover the maximum distance possible of carriage motion. Thus, even if the head carriage happened to be in near proximity along the lead screw to the carriage stop, the full recalibration process must be performed. In this event, the motor continues to apply force even when physical abutment features have already come into contact. This not only increases the wear on the components of the carriage guidance system, but also wastes time.

Therefore, there is a need for an improvement in a magnetic head carriage guidance system. More particularly, there is a need for a carriage stop that will have all the functionality of the conventional carriage stop but without the inherent problems of using a physical contact mechanism to establish a reference point.

SUMMARY OF THE INVENTION

Fundamentally, the present invention relates to a magnetic head guidance and calibration system that utilizes a non-contacting reference position sensor and its method of operation.

An advantage of the present invention is increased accuracy in determination of the head position recalibration reference point.

It is another advantage of the present invention that it creates a magnetic head carriage guidance system reference point without the requirement of a physical contact point between any features of the system mechanism.

It is an advantage of the present invention that there is no contact between components to cause wear and, thus, degrade performance.

Yet a further advantage of the present invention is the reduction of wear in parts associated with the movement of the magnetic head and resultant improvement of repeatability in positioning the head.

Still another advantage of the present invention is that it eliminates acoustic noise caused by impact of mechanical carriage stop devices.

A further advantage of the present invention is that it reduces the time required for the head position recalibration process.

In the main, a device is provided wherein a reference position sensing device for a recording media drive apparatus having a read-write head adapted to read and write on a recording medium, said head being fixedly mounted on a head carriage connected to a head carriage moving mechanism for imparting translational movement to said head across said medium comprises a sensor for transmitting a signal to said head moving mechanism to indicate that said carriage is at a predetermined reference position, and a transmitter device, mounted in noncontacting juxtaposition to said sensor when said carriage is at said reference position, for indicating to said sensor that said reference position has been achieved.

Other objects, features and advantages of the present invention will become apparent upon consideration of the following detailed description and the accompanying drawings, in which like reference designations represent like features throughout the FIGURES.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable.

Figure 1:
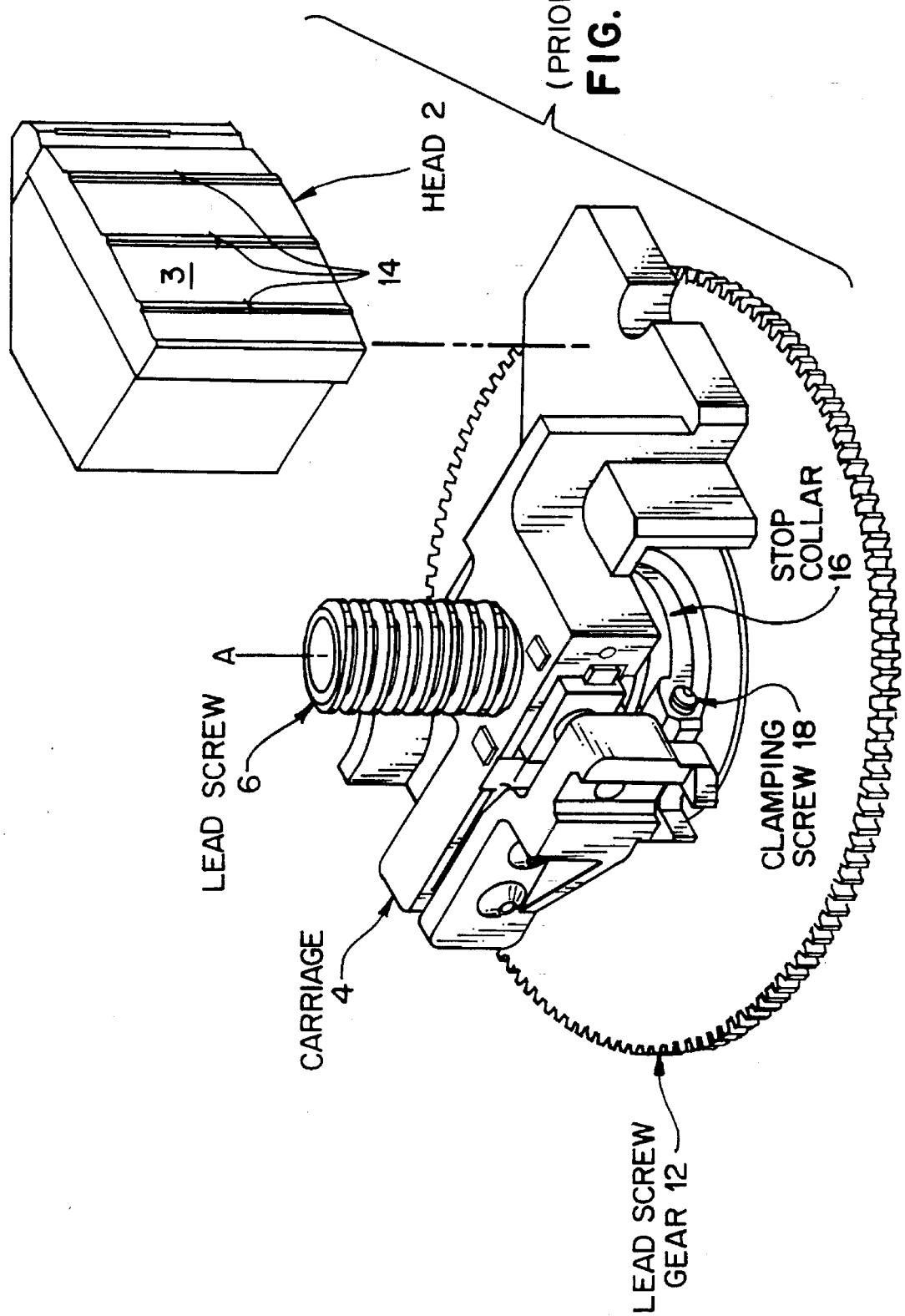
FIG. 1 is a perspective view depiction of a conventional prior art magnetic head guidance system with a magnetic head shown exploded from its mounting table on a head carriage.
Figure 2:
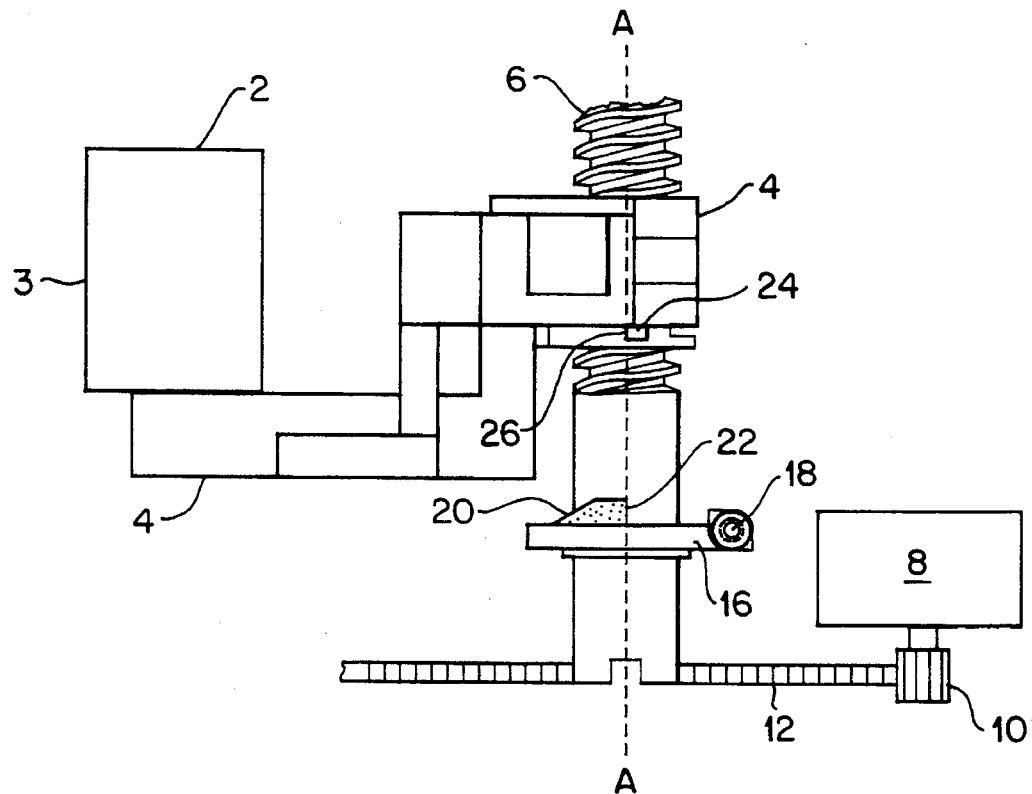
FIG. 2 is a plan view depiction of the prior art system of FIG. 1 with the head carriage in a typical read/write position.
Figure 3:
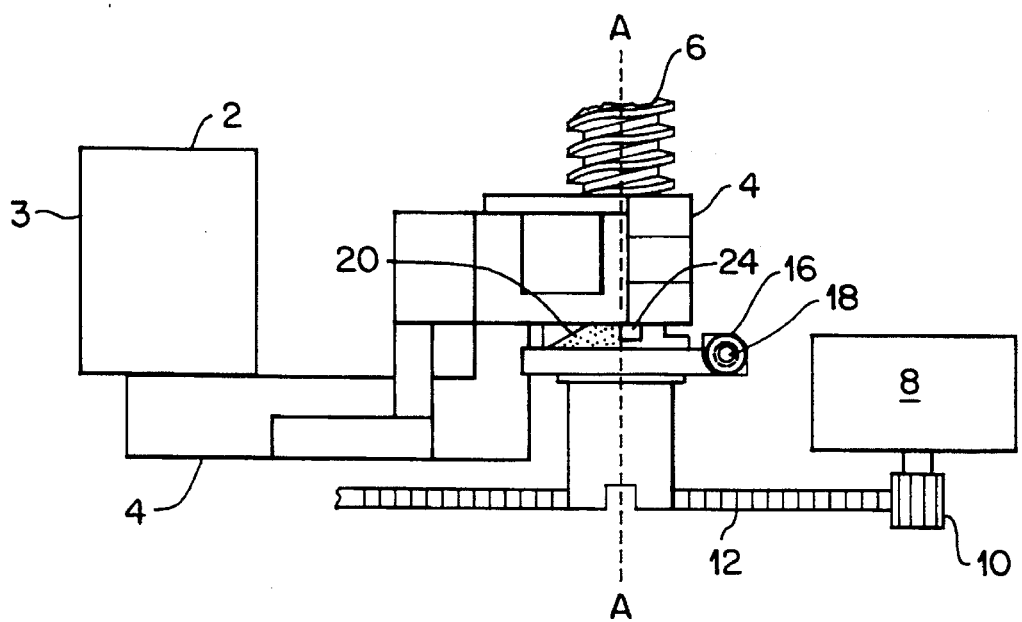
FIG. 3 is a plan view depiction of the system of FIG. 2 with the head carriage at the reference point position.

For clarity and economical disclosure, the present invention is described in relation to a prior art tape drive type apparatus as shown in FIGS. 1–3. A person skilled in the art will readily recognize the invention's adaptability to other types of magnetic media storage devices. Furthermore, while the drawings show a particular orientation of the apparatus, rather than a limitation on the invention it is to be understood that in commercial practice the actual orientation with respect to the local horizontal is a matter of design expediency as computer peripherals are generally designed to be operable regardless of operational orientation.

Figure 4:
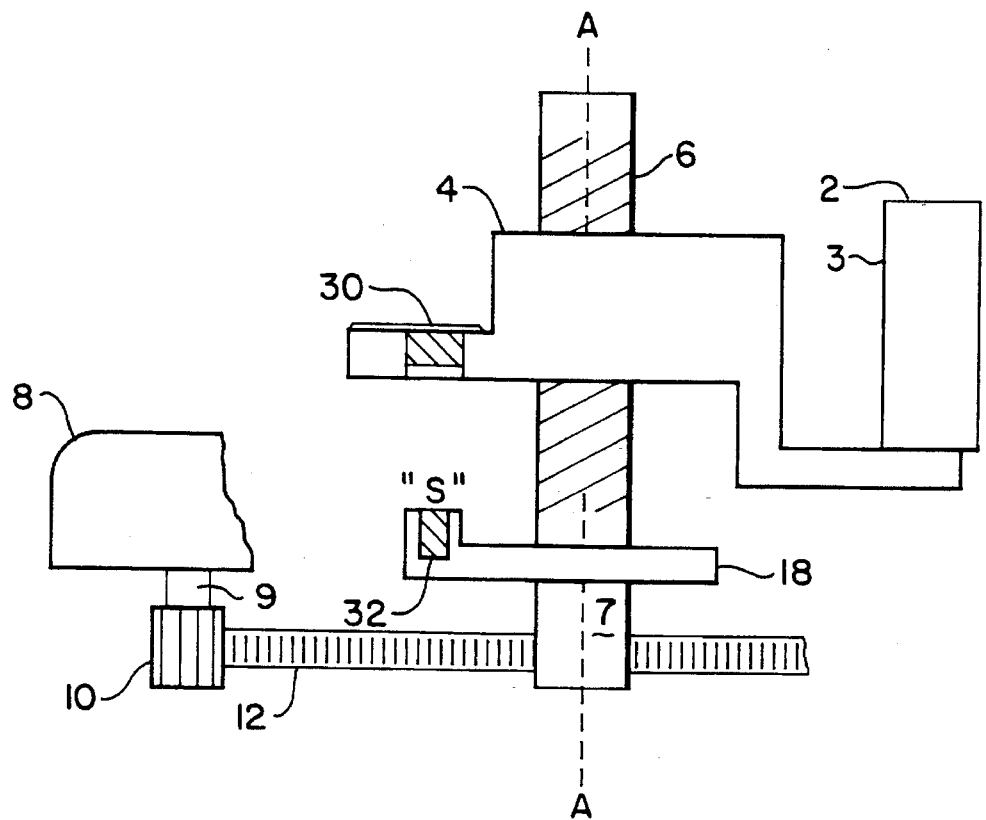
FIG. 4 is a plan view (side) depiction of the magnetic head guidance system of the present invention with the head carriage in a typical read/write position.

Referring now to FIG. 4, a magnetic head guidance system for a tape drive is shown. A magnetic head 2, adapted for reading and writing on a magnetic tape (not shown) that is driven across the head face 3, is mounted on a head carriage 4. The carriage 4 rides via a threaded through aperture (not shown) on a lead screw 6 that raises or lowers the head 2 linearly across the width of the magnetic tape whereby the head can read and write on multiple parallel tracks on the tape. A stepper motor 8 is connected to the lead screw 6 by gears, including a motor shaft 9 mounted pinion gear 10 and a transmission gear 12. A microprocessor (not shown) controls the stepper motor 8 to rotate the lead screw 6 in accordance with data processing need and thus move the carriage 4 linearly along axis A—A. In this manner, the head 2 (and integral gaps 14 as shown in FIG. 1) can be brought into preselected alignment with any one of the various tracks across the tape width. The lead screw 6 has a stop collar 17 fixedly mounted on the shaft 7 such that the stop collar 17 rotates radially in a fixed orientation about center axis A—A of lead screw 6.

In operation, as the motor 8 turns the gears 10, 12, the lead screw 6 will rotate accordingly. Depending on the direction of rotation, the carriage 4 and head 2 will either rise or fall parallel to axis A—A.

Mounted on the carriage 4 is a digital position sensor 30. In the preferred embodiment of the present invention, a digital Hall-effect sensor is used as a carriage position sensor 30.

Hall-effect sensors are commercially available, such as the model UGN3140 by Allegro. Essentially, a Hall-effect sensor is a switch that turns on at or below its maximum operating point flux density and, when a proximal magnetic field is reduced, the device turns off even before the flux density drops below its minimum release point value. The Hall has a minimum amount hysteresis to ensure clean switching action occurs, even if mechanical vibration or electrical noise is present, only once per threshold crossing. The operating point at which the Hall-effect sensor is ON and capable of sinking a small current is extremely consistent. Thus, it offers substantial advantages over other types of switches.

The Hall-effect sensor 30 is mounted with its active surface pointed downward in a plane parallel to axis A—A. A trigger for the Hall-effect sensor 30 is provided by mounting a permanent magnet 32 on the stop collar 17. The magnet 32 is mounted on the stop collar 17 such that its radial distance from axis A—A is the same distance as the plane of the center of the active surface of the Hall-effect sensor 30. The magnet 32 is selected to provide a field strength designed to activate the Hall-effect sensor at a predetermined air gap distance proximity. For the Allegro model UGN3140, a magnet capable of producing 300 gauss of flux at a distance of 0.060 inch from the south pole (designated "S" in FIG. 4) is used. In assembly of the magnetic head guidance system, the stop collar is adjusted such that when the carriage 4 is at its recalibration reference position (FIG. 5), the south pole of the permanent magnet 32 has activated the Hall-effect sensor 30 switch to its ON mode.

Figure 5:
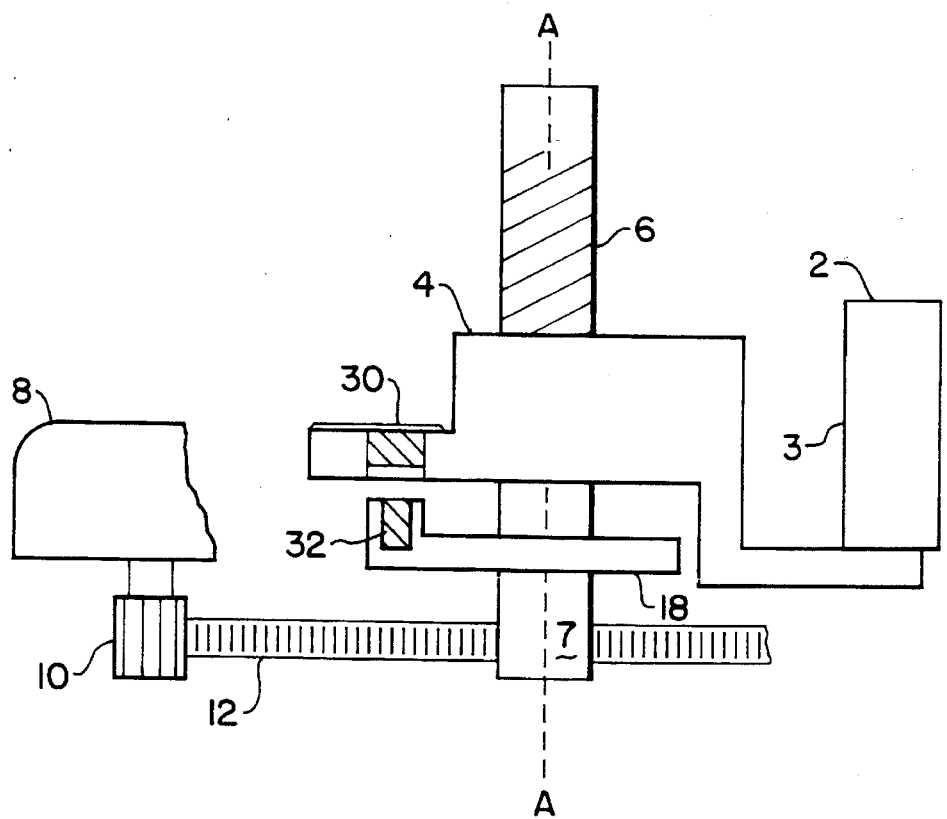
FIG. 5 is a plan view depiction of the invention as shown in FIG. 4 with the carriage at the reference point position.

In operation, such as when a new magnetic tape cartridge is loaded into the drive or a recalibration instruction is ordered by the drive microprocessor, such as during a power-up mode, the stepper motor 8 will apply a driving force to rotate the gears 10, 12 and the lead screw 6 in order to move the carriage 4 toward the predetermined reference position. As the lead screw 6 rotates, stop collar 17 will follow and the magnet 32 will fly in a fixed radius circular orbit about center axis A—A of the lead screw 6. As the carriage 4 closes in on the fixed stop collar 17, the air gap between the Hall-effect sensor 30 and the magnet 32 will decrease. As depicted in FIG. 5, at such rotation as the total effective air gap between the Hall-effect sensor 30 and the magnet 32 reaches the critical separation in a slide-by mode, the Hall-effect sensor 30 will switch to ON and an appropriate limit signal will be transmitted to the stepper motor 8, stopping motion of the head carriage 4.

In order to increase precision in determining the reference point, the inventors have found that a two pass method, coarse recalibration followed by fine adjustment, provides extremely accurate repeatability in bring the head carriage to the predetermined reference point.

Figure 6A:
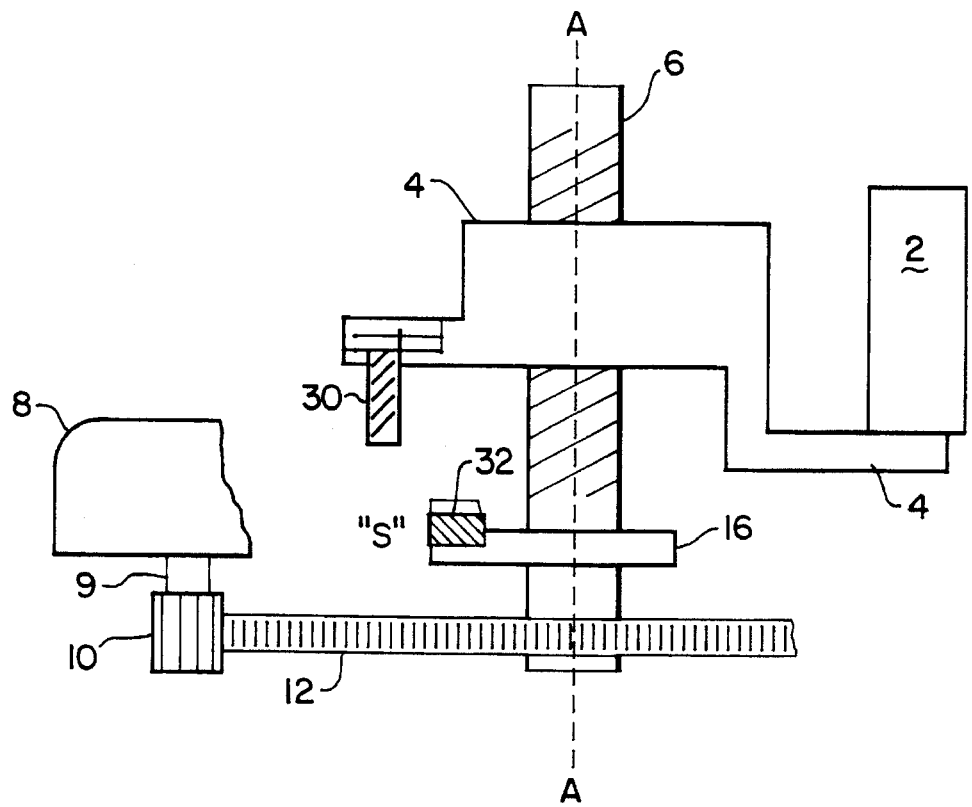
FIG. 6A is a plan view (side) depiction of an alternative embodiment of the present invention with the head carriage in a typical read/write position.
Figure 6B:
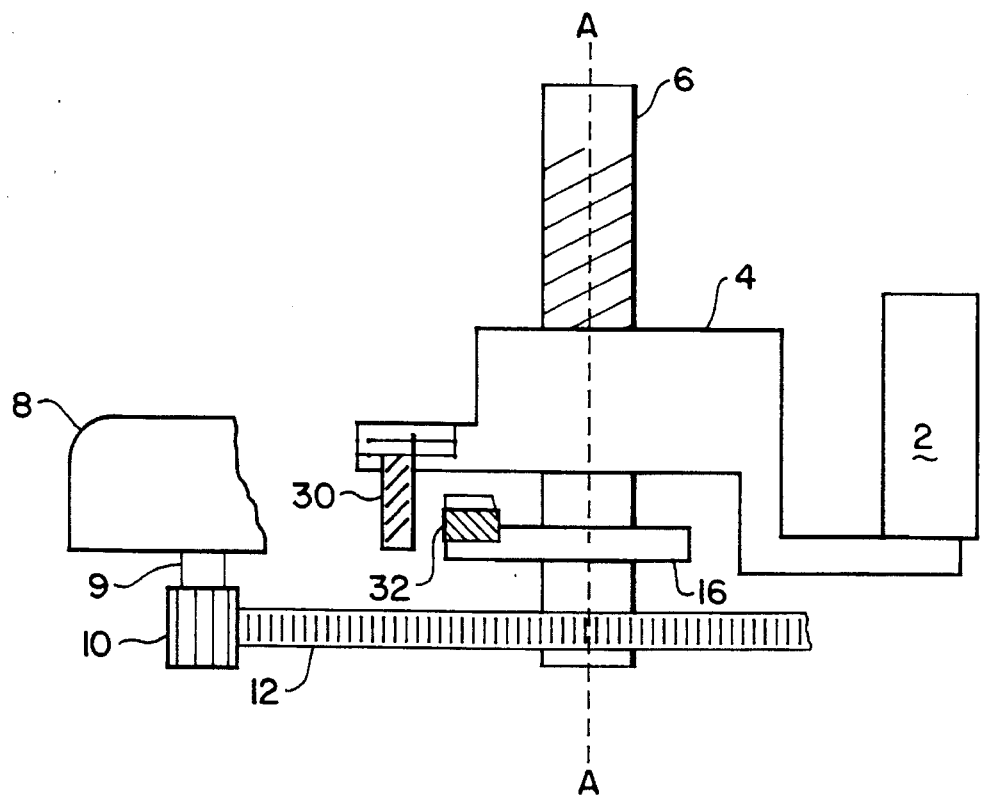
FIG. 6B is a plan view of the invention as shown in FIG. 6A with the carriage at the reference point position.

Referring now to FIGS. 6A and 6B, an alternative mounting arrangement for the sensor magnetic field sensing device 30 and the magnet 32 are shown. The permanent magnet 32 is mounted on the circumference of rotating stop collar 17. The orientation of the magnetic field at pole "S" is altered to be parallel to the sensor 30 as the elements are brought into proximity (FIG. 6B). Depending upon the physical restraints in terms of space availability in any particular design, this alternate arrangement may be preferable.

Figure 7:
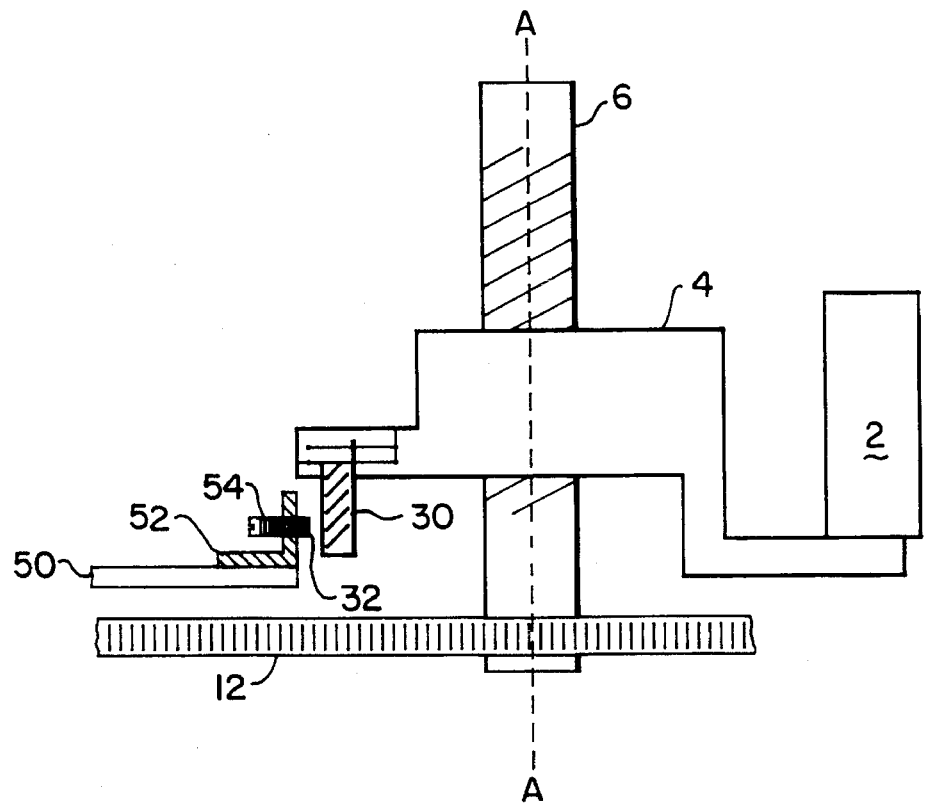
FIG. 7 is a plan view (side) of an alternative embodiment of the present invention in which an element of the invention is shown in an alternative mounting arrangement from FIGS. 4, 5, 6A and 6B with the carriage at the reference point position.

In an alternative embodiment shown in FIG. 7, since the prior art requisite physical contact has been eliminated, it would be alternatively possible to rearrange the guidance system such that the stop collar mounting of magnet 32 also might be eliminated. The configuration could be rearranged such that the Hall-effect sensor 30 is moved toward a magnet fixed on an adjacent frame portion of the drive. While the head-on mode is simple, works well, and is relatively insensitive to lateral motion, if the stepper motor were to overshoot the mark, a collision could occur and damage the sensor. Thus, the stop collar slide-by mode is preferable. Depending on the application, economy of parts, orientation of the elements involved in establishing a reference position stop point, the stop collar mounting arrangement can be eliminated, as shown in the alternative embodiment of FIG. 7. The magnet 32 has been moved from a stop collar to a position adjustment screw 54 extremity mounted on a bracket 52 which has been affixed to a portion of the drive frame 50. Such an arrangement allows for fine tuning of the trigger point of the sensing device 30 as it is brought into proximity of the magnetic field by adjusting the spacing between the sensor and the magnet 32 with adjustment screw 54.

Figure 8A:
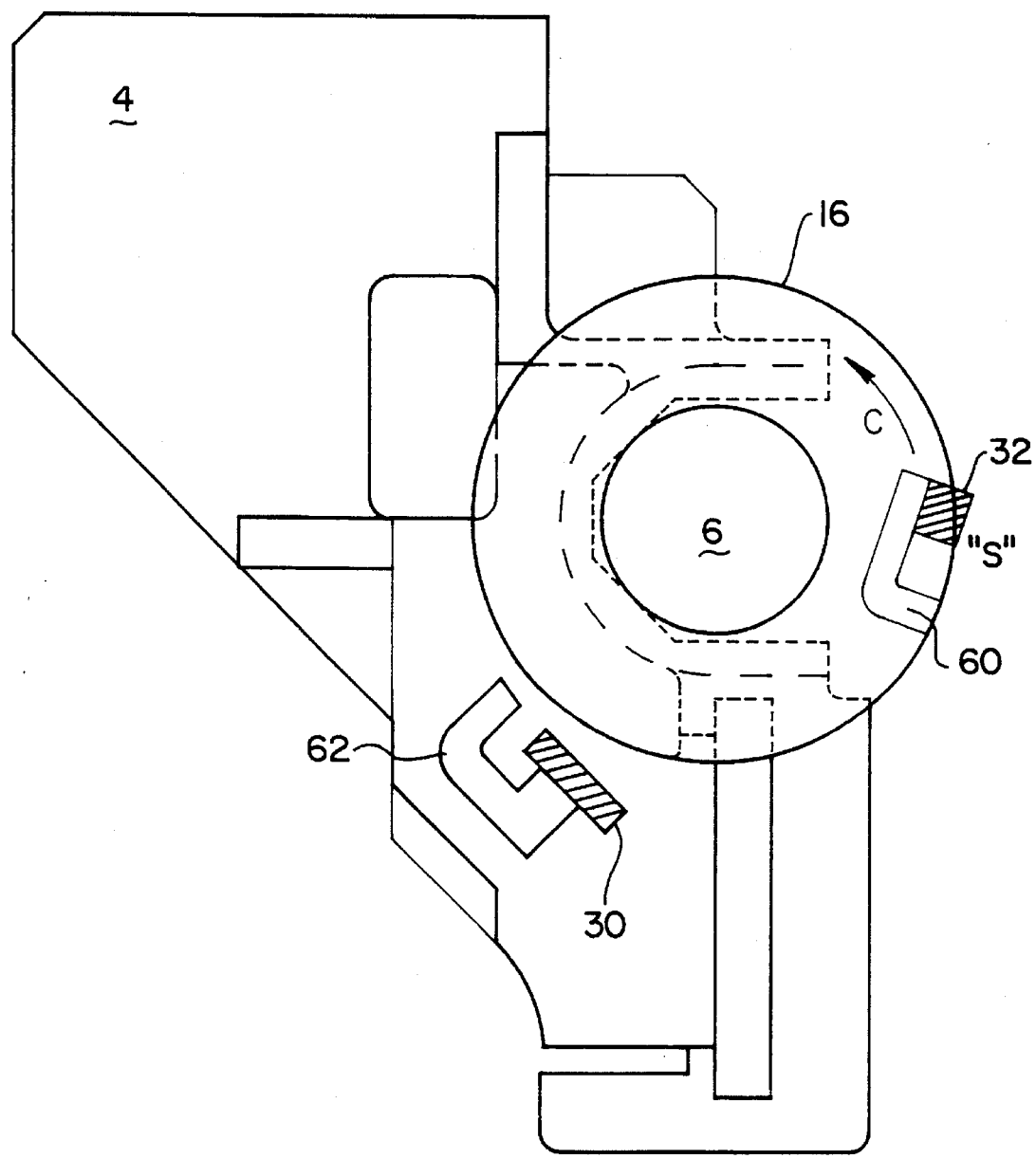
FIG. 8A is a plan view (end) of an alternative embodiment of the present invention with the head carriage in an orientation off reference position point.
Figure 8B:
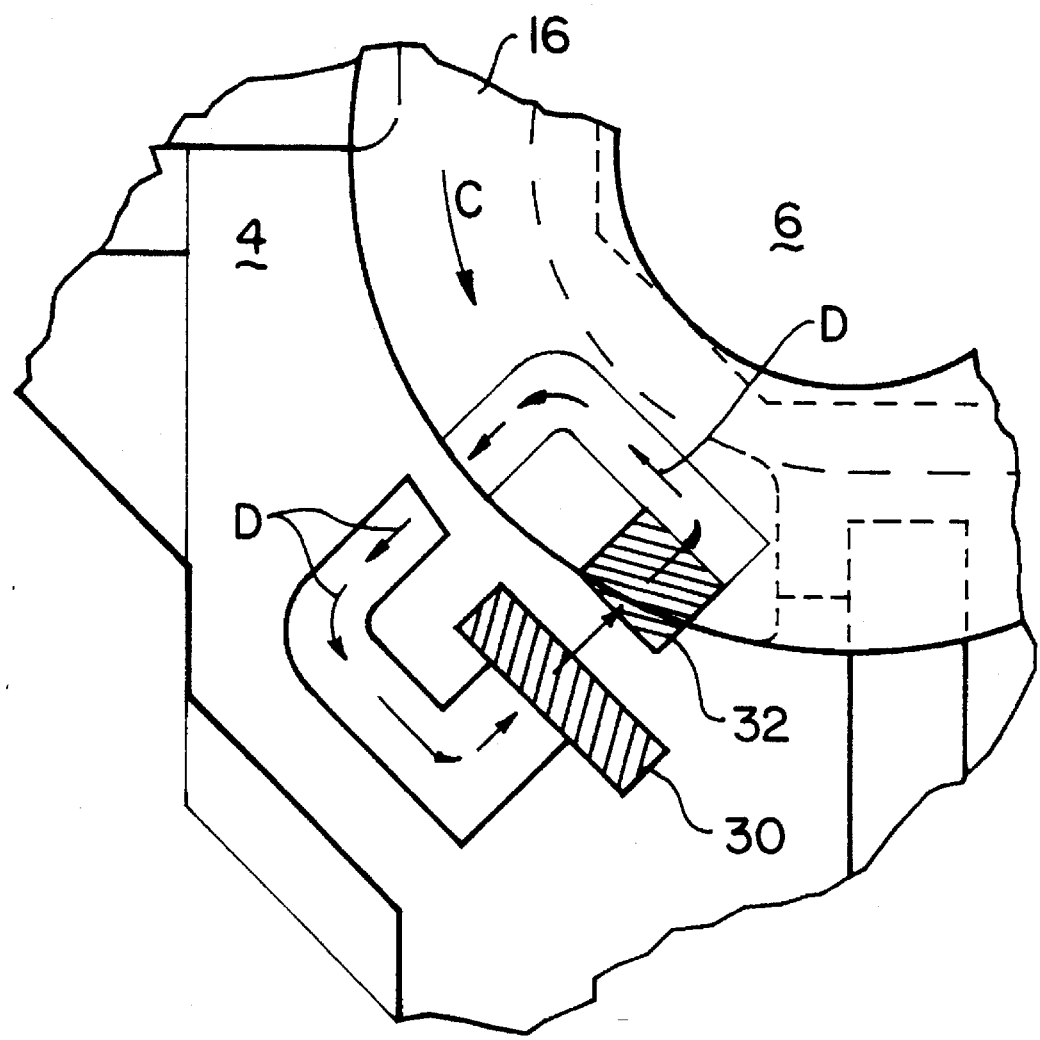
FIG. 8B is a detail view of the embodiment shown in FIG. 8A with the head carriage in the reference position.

FIGS. 8A and 8B show yet another alternative embodiment in which a magnet 32 installation scheme is used to concentrate the magnetic flux. This embodiment is apropos to a system in which the adjustment range of the stop collar 17 is very limited. The magnet 32 is mounted on the stop collar 17 with a magnetic flux return member 60. A magnetic field sensor 30, such as a Hall-effect switch, is affixed to the head carriage 4 and also has a magnetic flux return member 62. As the stop collar rotates, in the direction depicted by arrow "C," magnet 32 first encounters flux return member 62. As shown in FIG. 8B, the flux path, indicated by arrows "D," then is specified through the return members 60, 62. Thus, the path D concentrates the flux at the Hall-effect switch 32 with less accurate alignment as may be required in prior embodiments. While this embodiment may provide increased stability with change in operating temperature, with currently available techniques it may be more expensive.

In another envisioned embodiment, a digital position sensor such as a magneto-resistive device (e.g., Honeywell 2SSP Series) is substituted for the Hall-effect sensor. While the physical configuration is approximately the same as shown in FIGS. 4 and 5, and such devices allow much greater sensor-to-magnet operating distances (the 2SSP Series will switch at one-inch), due to the inherent high sensitivity, the arrangement would have to be optimized to prevent stray magnetic fields, such as from the magnetic head, wires, and motors, from affecting operation. Such an embodiment may provide a size advantage for the drive designer.

Figure 9:
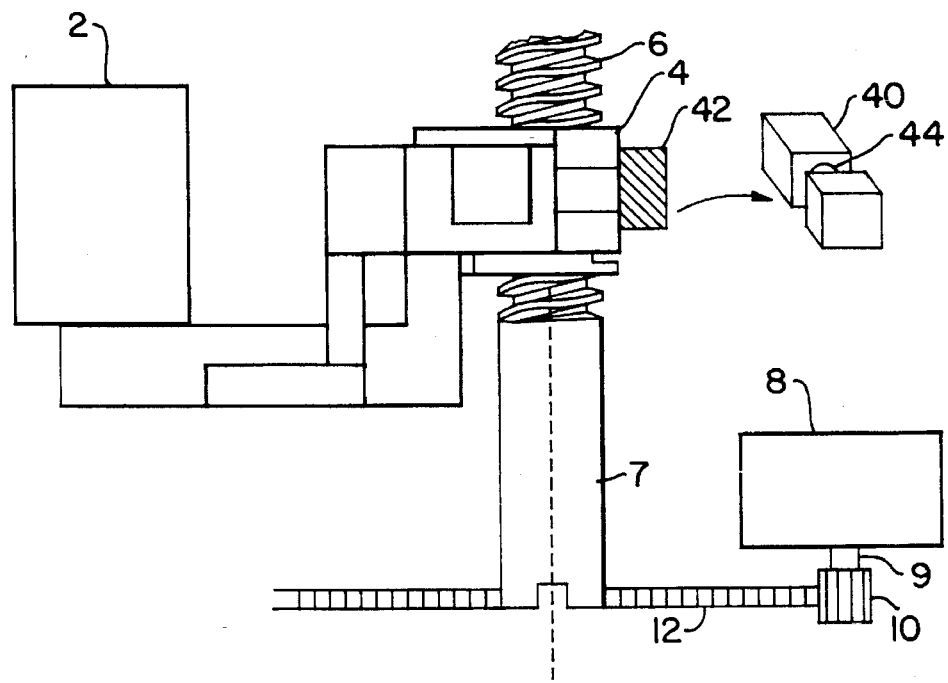
FIG. 9 is a plan view (side) of an alternative embodiment of the present invention in which alternative reference position sensing elements are employed.

In another embodiment, depicted in FIG. 9, a contactless photomicrosensor (commercially available, such as the OMRON EE-SX1 series) can be used in a configuration which also totally eliminates the need for a stop collar. A slot type photomicrosensor 40 (also commonly known as "optical interruption switches") can be mounted, for example on a part of the drive frame (not shown), such that an opaque vane member 42 mounted on head carriage 4 will interrupt the light emitter/receiver 44 infrared beam in the photomicrosensor 40 and switch an integral transistor output stage, similarly transmitting a signal representative of achieving the desired head reference position to the stepper motor 8, stopping rotation.

Figure 10:
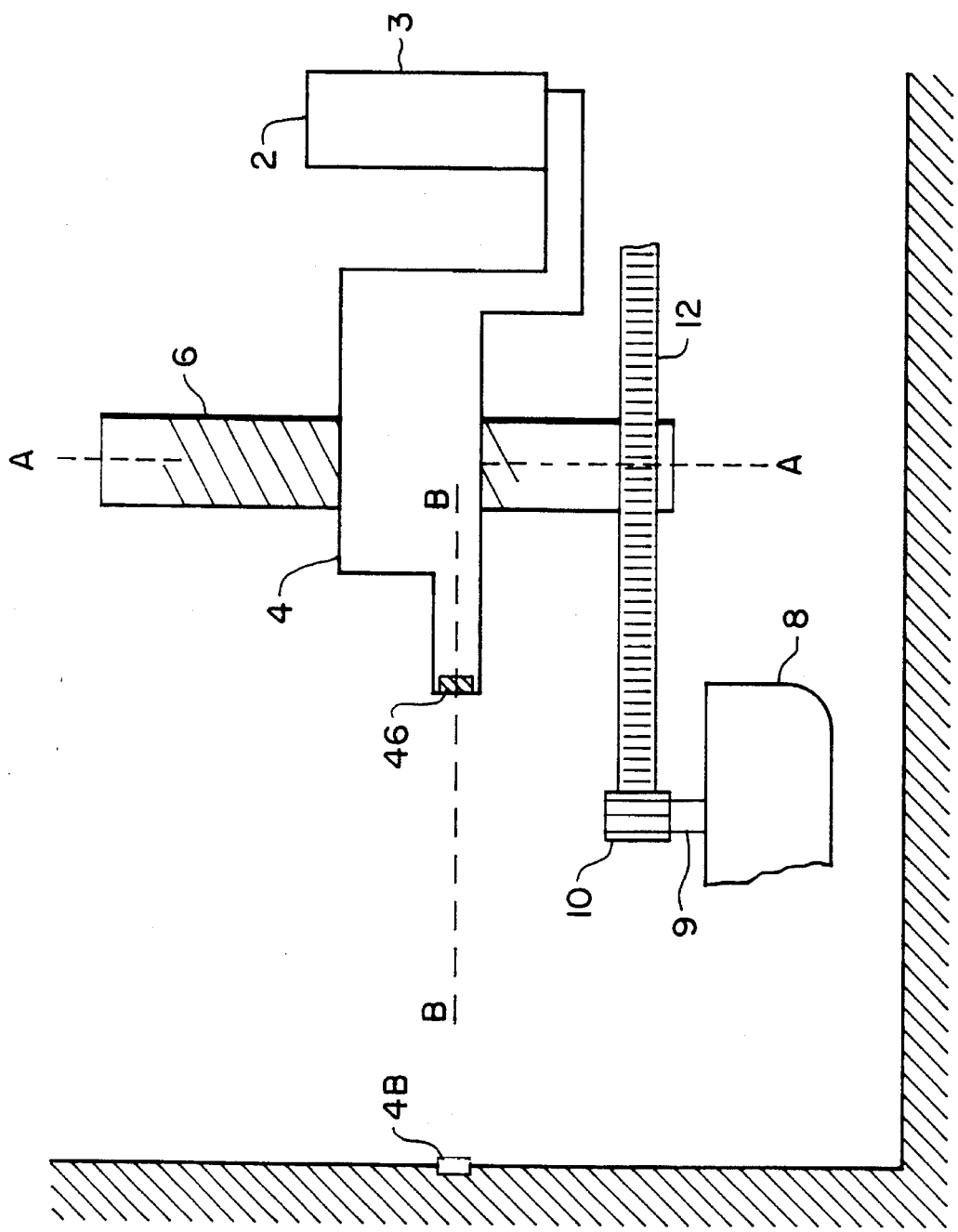
FIG. 10 is a plan view (side) of an alternative embodiment of the present invention in which another alternative reference position sensing element system is employed.

In yet another envisioned embodiment, depicted in FIG. 10, an electrooptical sensing scheme is used to sense the achievement of recalibration reference point. In place of the digital position sensor 30, a reflective type photomicrosensor 46 can be mounted on head carriage 4. The beam, along axis B—B, will be activated and provide a switched transducer output signal from the photomicrosensor 46 to the drive controller circuitry only when the infrared beam is reflected from mirror element 48 mounted appropriately on drive frame 50 to the sensor 46, similarly transmitting a signal representative of achieving the head reference position, stopping rotation of the stepper motor 8. However, the higher cost, greater accuracy required in assembly of electro-optical sensing systems, and the danger of dust contamination makes such design choice less desirable than the electro-magnetic sensor systems disclosed above.

It has been further discovered that better repeatability in stopping the head carriage at a precise predetermined reference point can be achieved in the preferred embodiment by performing both a coarse alignment followed by a fine adjustment.

Figure 11:
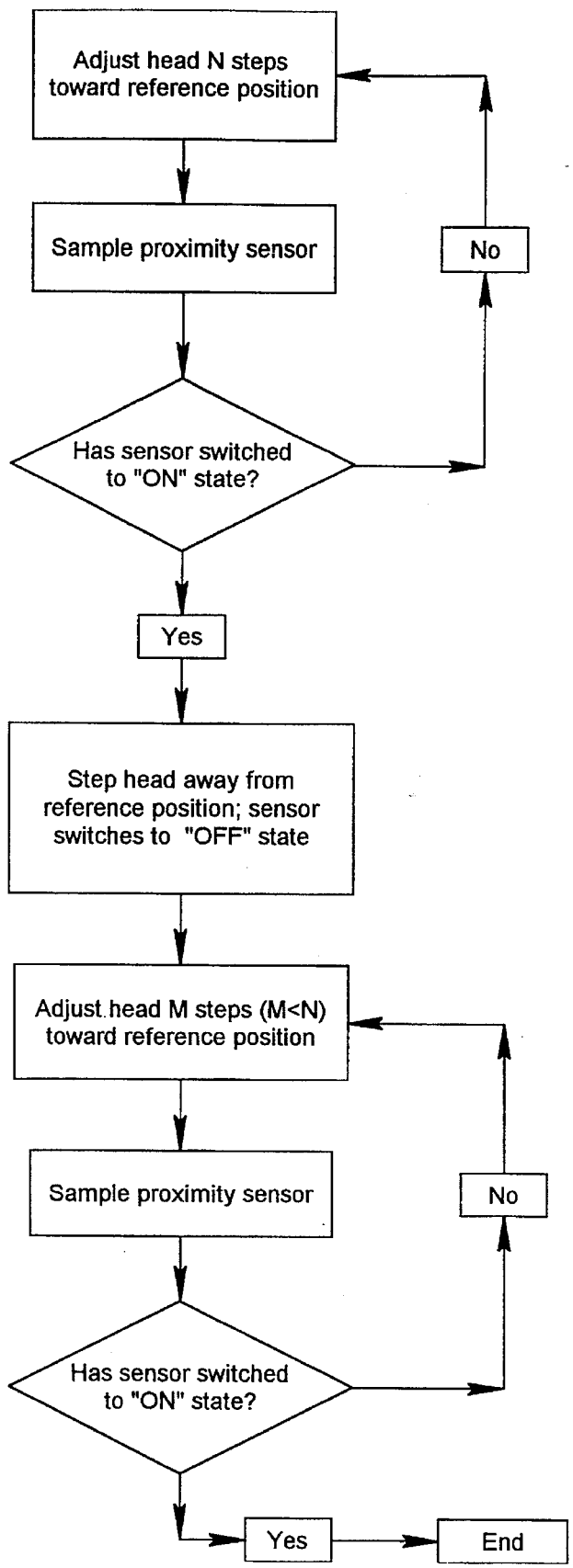
FIG. 11 is a flow diagram of an embodiment of the present invention including a course and fine adjustment of the head with respect to the reference position.

For example, it has been found in the recalibration process that polling the sensor output and accepting the output as TRUE when two out of three samples are TRUE optimizes performance. As shown generally on FIG. 11, using the preferred embodiment mechanism, a coarse adjustment pass is performed in which the head is stepped downward at approximately 400 steps per second, while sampling the Hall-effect sensor at a period of 16 milliseconds. When the Hall-effect sensor output becomes TRUE, the step sequencer is stopped by turning off a STEP ENABLE signal to the stepper motor. This also sets the phase control of the stepper motor to Phase 0. The head is then stepped up 64 steps. The head is then stepped downward four steps at a time, waiting for the settling delay time, and polling the Hall-effect sensor output. The polling of the sensor is taken at each Phase 2 position of the stepper motor. This sequence is repeated until the sensor output becomes TRUE. When the output becomes TRUE—indicating that the appropriate reference position of the carriage has been achieved—the head is stepped up two steps to reposition the stepper motor to the appropriate Phase 0 position.

```
recal_process ( )
    start stepper downward at 400 steps/second for 2270 steps
    while (hall_output EQUALS FALSE AND stepper not done)
        hall-output = read_hall_sensor ( )
    if (hall_output EQUALS TRUE)
        turn off STEP ENABLE
    else if (step sequencer completed 2270 steps)
        indicate hall sensor failure and exit
    start stepping upward at 400 steps/second for 64 steps
        wait for stepper to complete
        hall_output = read_hall_sensor( )
        if (hall_output EQUALS TRUE)
            indicate stepper failure and exit
    while (hall_output EQUALS FALSE AND
    limit_counter < 64)
        {
        start stepping downward for 4 steps
        wait for stepper to complete
        wait settling time
        hall_output = read_hall_sensor( )
        increment limit_counter
        }
    if (hall_output EQUALS TRUE)
        step upward for 2 steps
    else if (limit_counter EQUALS 64)
        indicate hall sensor failure and exit
    set step_counter = 0
    }
read_hall_sensor ( )
    {
    hall_true_count = 0
    sample_count = 0
    while (sample_count < 3)
        {
        input serial byte
        if (hall sensor EQUALS TRUE)
            increment hall_true_count
        increment sample_count
        }
    if (hall_true_count > 1)
        return (TRUE)
    else
        return (FALSE)
    }
```

It has been found that such a recalibration process can be accomplished in less than five seconds.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. In a computer peripheral magnetic tape drive device, having a magnetic head adapted to read and write on magnetic tape, said head being connected to a lead screw driven by a stepper motor for translational movement across said magnetic tape, a method of repeatably positioning said head at a predetermined reference position using a contactless head stop device, having components mounted proximate said head and at said reference position for indicating attainment of said reference position by said head only when said components are in a predetermined juxtaposition, comprising the steps of:

a) stepping said head toward said stop device component at said reference position at a first rate while sampling said stop device for an output signal indicative of attainment of said reference position;

b) stopping said stepping when said output of said stop device changes from a first state to a second state which is indicative of said attainment of said reference position;

c) stepping said head in a reverse direction for a first predetermined number of steps to change said stop device output from said second state to said first state;

d) stepping said head toward said stop device component at said reference position a second predetermined number of steps;

e) sampling said stop device;

f) repeating steps d) and e) until said stop device switches from said first state to said second state; and g) halting said stepping.

2. The method as set forth in claim 1, including:

d) waiting a predetermined time period between steps d) and e).

* * * * *